United States Patent
Park et al.

(10) Patent No.: US 9,543,796 B2
(45) Date of Patent: Jan. 10, 2017

(54) MOTOR WITH STEPPED ROTOR TUBE COUPLED TO THE INNER RACE OF A MULTIPLE-ROW BEARING

(71) Applicant: LG INNOTEK CO., LTD., Seoul (KR)

(72) Inventors: Kyung Sang Park, Seoul (KR); Seong Jin Kim, Seoul (KR); Jin Ho Kim, Seoul (KR); Chang Hyun Park, Seoul (KR); Woo Seob Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 119 days.

(21) Appl. No.: 14/547,235

(22) Filed: Nov. 19, 2014

(65) Prior Publication Data

US 2015/0137641 A1 May 21, 2015

(30) Foreign Application Priority Data

Nov. 19, 2013 (KR) .................. 10-2013-0140728

(51) Int. Cl.
| | |
|---|---|
| *H02K 1/28* | (2006.01) |
| *H02K 5/128* | (2006.01) |
| *H02K 5/173* | (2006.01) |
| *H02K 5/16* | (2006.01) |
| *H02K 7/08* | (2006.01) |
| *H02K 7/00* | (2006.01) |

(52) U.S. Cl.
CPC ............ *H02K 1/28* (2013.01); *H02K 5/128* (2013.01); *H02K 5/163* (2013.01); *H02K 5/1735* (2013.01); *H02K 7/085* (2013.01); *H02K 7/003* (2013.01)

(58) Field of Classification Search
CPC .......... H02K 1/28; H02K 5/128; H02K 7/085; H02K 5/163; H02K 5/1735; H02K 5/16; H02K 5/161; H02K 5/15; H02K 5/167; H02K 5/1672; H02K 5/1675
USPC .................. 310/156.09, 156.13, 402, 90
See application file for complete search history.

(56) References Cited

U.S. PATENT DOCUMENTS

| | | | | |
|---|---|---|---|---|
| 4,629,261 | A | * 12/1986 | Eiermann | F16C 32/0442 251/30.01 |
| 8,872,396 | B2 | * 10/2014 | Sakata | H02K 1/278 310/156.12 |
| 2003/0222525 | A1 | * 12/2003 | Rapp | H02K 5/1732 310/90 |

(Continued)

OTHER PUBLICATIONS

C. Rehman and H.P. Bloch: "Oil Mist-lubricated Pumps and Electric Motors", machinerylubrication.com, Sep. 13, 2013 (Sep. 13, 2013), CP002760072, Retrieved from the Internet: URL: https://web.archive.org/web/20130913001316/http://machinerylubrication.com/Read/883/oil-mist-lubricated [retrieved on Jul. 20, 2016].

(Continued)

*Primary Examiner* — Naishadh Desai
(74) *Attorney, Agent, or Firm* — KED & Associates, LLP

(57) ABSTRACT

A motor includes a stator, a rotor tube which is disposed inside the stator, a rotor core assembly which is coupled to an outer circumferential surface of the rotor tube, and a shaft which is coupled in the rotor tube. The rotor tube is divided into at least two stepped regions having different diameters. A multiple-row bearing has an inner wheel coupled to an outer circumferential surface of any one of the at least two stepped regions, and rotatably supports the rotor tube. Such a configuration ensures structural stability of the motor and minimizes a space occupied by a bearing.

4 Claims, 5 Drawing Sheets

(56) References Cited

U.S. PATENT DOCUMENTS

2004/0141286 A1* 7/2004 Willmer ................. H02K 5/225
                                                                           361/679.01
2007/0222326 A1* 9/2007 Ionel ........................ H02K 1/22
                                                                           310/216.067

OTHER PUBLICATIONS

European Search Report dated Jul. 27, 2016 issued in Application No. 14 19 3875.3.

\* cited by examiner

A-A'

MOTOR WITH STEPPED ROTOR TUBE COUPLED TO THE INNER RACE OF A MULTIPLE-ROW BEARING

CROSS-REFERENCE TO RELATED APPLICATION

This application claims priority under 35 U.S.C. §119 to Korean Application No. 10-2013-0140728, filed on Nov. 19, 2013, whose entire disclosure is incorporated herein by reference.

BACKGROUND

1. Field

The present disclosure relates to a motor.

2. Background

A motor is a device which converts electrical energy into rotational energy using force that is applied to a conductor in a magnetic field. Recently, the role of the motor becomes important as use of the motor multiplies. In particular, as the number of electrical components for vehicles is rapidly increased, the demand for the motors, which are applied to a steering system, a braking system, a design system, and the like, is greatly increased.

In particular, there are many instances in which external force is applied to the motor in an axial direction. Therefore, motors, in which bearings such as angular bearings, which support axial loads, and washers are combined with the rotor, are presented.

Typically, the motor has a shaft which is rotatably formed, a rotor which is coupled to the shaft, and stators which are fixed inside a housing, and the stators are installed along a circumference of the rotor at intervals. Further, coils, which form rotational magnetic fields, are wound around the stators, and generates an electrical interaction with the rotor, thereby inducing rotation of the rotor. When the rotor is rotated, the shaft is rotated to create braking force, steering force, and the like, or assist in creating braking force, steering force, and the like.

Meanwhile, because the rotor may rattle under a condition of when the motor receives an axial load, bearings, which rotatably support the shaft, may be installed. Typically, two bearings are installed at a lower end portion and an upper end portion of the shaft, respectively. However, the aforementioned configuration may achieve structural stability, but there is a problem in that there are many limitations in designing the motor due to a space occupied by the bearings.

BRIEF DESCRIPTION OF THE DRAWINGS

The embodiments will be described in detail with reference to the following drawings in which like reference numerals refer to like elements wherein.

DETAILED DESCRIPTION

In the case of a motor which receives an axial load, there is a risk that a rotor collides with a stator due to rattling of a shaft. In order to prevent the risk, bearings are installed at an upper end portion and a lower end portion of the shaft, respectively. The bearings support an axial load and a radial load, which are applied to the motor, thereby ensuring structural stability of the motor. However, since the bearings need to be installed at the upper end portion and the lower end portion of the shaft, respectively, there is a serious constraint in designing the motor for reducing a size and a weight of the motor. In order to basically solve the aforementioned problem, a motor according to an exemplary embodiment of the present disclosure has been designed to eliminate the bearing installed at the upper end portion of the shaft, and reinforce a support structure of the lower end portion of the shaft.

Figure 1:
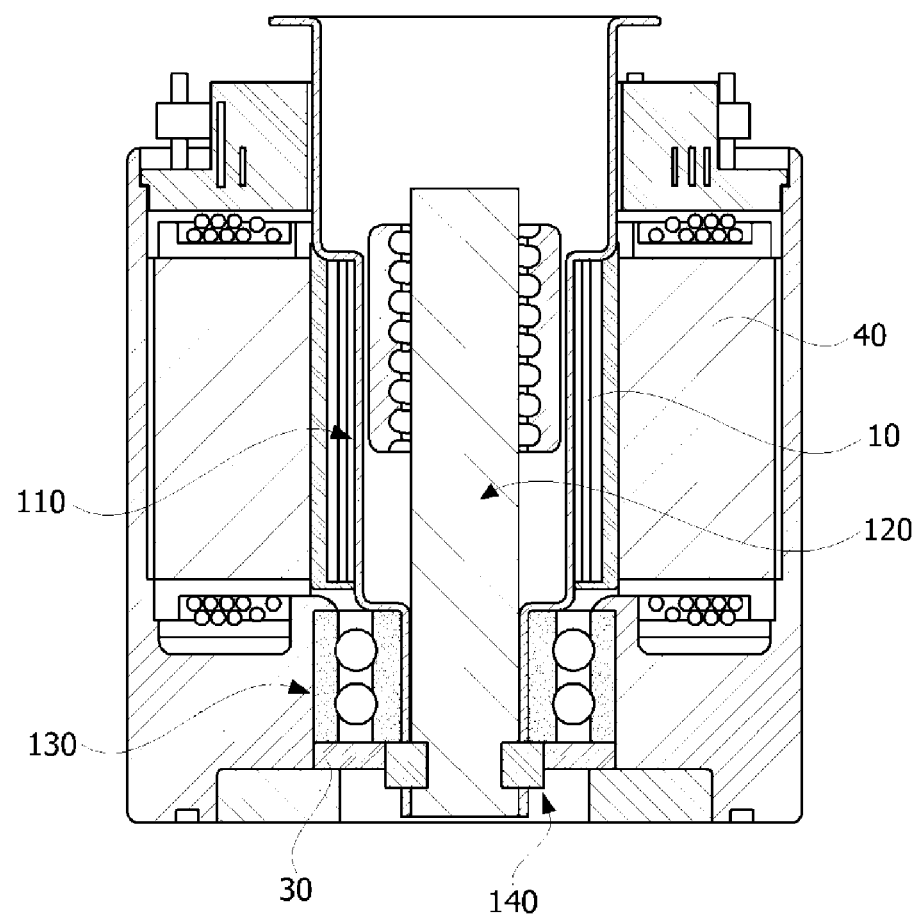
FIG. 1 is a view illustrating a motor according to an exemplary embodiment of the present disclosure.
Figure 2:
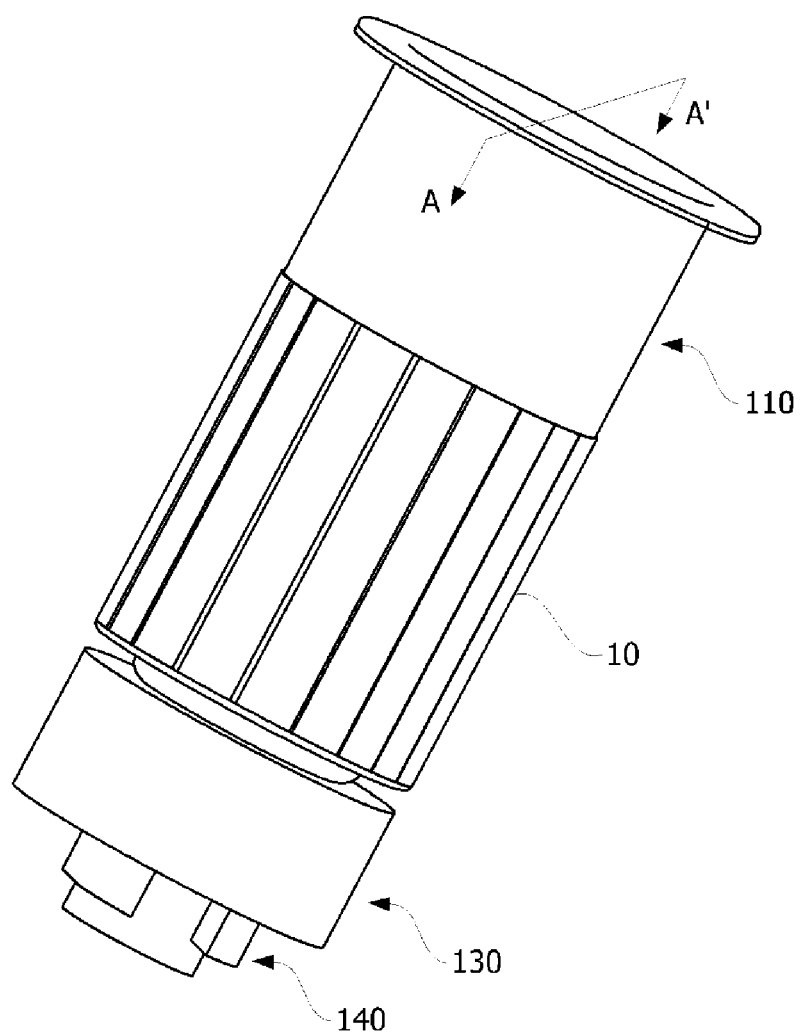
FIG. 2 is a view illustrating a rotor assembly of the motor illustrated in FIG.
Figure 3:
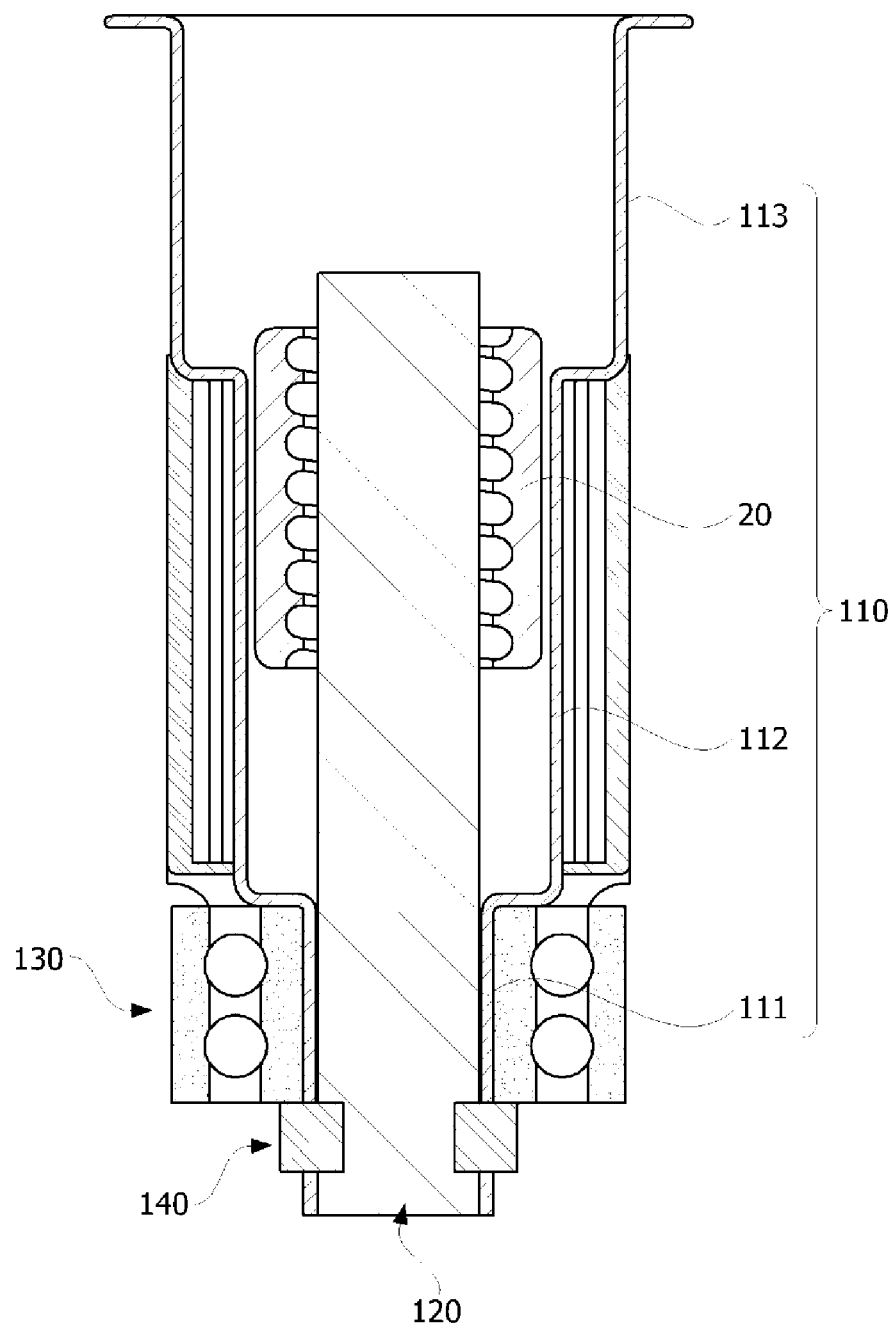
FIG. 3 is a view illustrating a cross section of the rotor assembly illustrated in FIG. 2 which is taken along line A-A'.

FIG. 1 is a view illustrating a motor according to an exemplary embodiment of the present disclosure, FIG. 2 is a view illustrating a rotor assembly of the motor illustrated in FIG. 1, and FIG. 3 is a view illustrating a cross section of the rotor assembly illustrated in FIG. 2 which is taken along line A-A'. FIGS. 1 to 3 illustrate main characteristic parts or components for understanding of the present disclosure. As a result, various modifications to the illustrations may be possible without departing from the present disclosure, and the scope of the present disclosure is not limited to specific shapes illustrated in the drawings.

As shown, a motor may include a stator 40, a rotor tube 110, a shaft 120 which is coupled in the rotor tube 110, and a multiple-row bearing 130 which rotatably supports a lower end portion of the rotor tube 110.

The rotor tube 110 may be formed in a cylindrical shape so as to include the shaft 120 therein. Further, a diameter of the rotor tube 110 is decreased in a stepwise manner toward a lower side of the rotor tube 110 in a longitudinal direction of the rotor tube 110, such that a plurality of stepped regions 111, 112, and 113 may be formed. The purpose of the aforementioned configuration is to support an axial load by stepped portions formed between the stepped regions 111, 112, and 113.

The shaft 120 may be coupled by being press-fitted into the lowermost stepped region 111 of the rotor tube 110. Further, the multiple-row bearing 130 may be configured to rotatably support the lowermost stepped region 111 of the rotor tube 110. The lowermost stepped region 113 of the rotor tube 110 may be formed at an appropriate height in consideration of a supporting region with which an inner wheel of the multiple-row bearing 130 is in direct contact.

Meanwhile, a rotor core assembly 10 may be coupled to the intermediate stepped region 112 of the rotor tube 110. The uppermost stepped region 113 of the rotor tube 110 may be coupled to other components, or an assembly for connection with other components. In the description of the motor according to the exemplary embodiment of the present disclosure, the rotor tube 110 having the aforementioned shape is exemplified, but the present disclosure is limited thereto.

The multiple-row bearing 130 may be formed by combining a single-row type upper-row bearing and a single-row type lower-row bearing in a rear combination manner or a front combination manner. Because the multiple-row bearing 130 has a larger axial supporting region than a single-row bearing, it is possible to more effectively support the shaft 120 while preventing the shaft 120 from rattling. As a result, structural stability of the motor may be ensured even though the bearing, which has been installed at the upper end portion of the shaft 120, is eliminated.

The upper-row bearing of the multiple-row bearing 130 may be any one of an angular contact ball bearing, a 4-point contact ball bearing, a tapered roller bearing, and a ball bearing. The lower-row bearing of the multiple-row bearing 130 may also be any one of an angular contact ball bearing, a 4-point contact ball bearing, a tapered roller bearing, and a ball bearing.

The upper-row bearing and the lower-row bearing of the multiple-row bearing 130 may be made from a combination of bearings having different shapes. In particular, by allowing contact angles of the upper-row bearing and the lower-row bearing of the multiple-row bearing 130 to be different from each other, an axial load and a radial load may be simultaneously supported.

The multiple-row bearing 130 may be installed to rotatably support the lowermost stepped region 111 of the rotor tube 110. Further, an upper surface of the inner wheel of the multiple-row bearing 130 may be configured to support the stepped portion of the lowermost stepped region 111.

An axial load supporting block 20, which has an inner circumferential surface having screw threads, may be press-fitted into the intermediate stepped region 112 of the rotor tube 110. Further, screw threads are formed on an outer circumference of an upper end portion of the shaft 120, such that the shaft 120 may be thread-coupled to the axial load supporting block 20. The purpose of the aforementioned configuration is to more effectively support an axial load applied to the motor.

Figure 4:
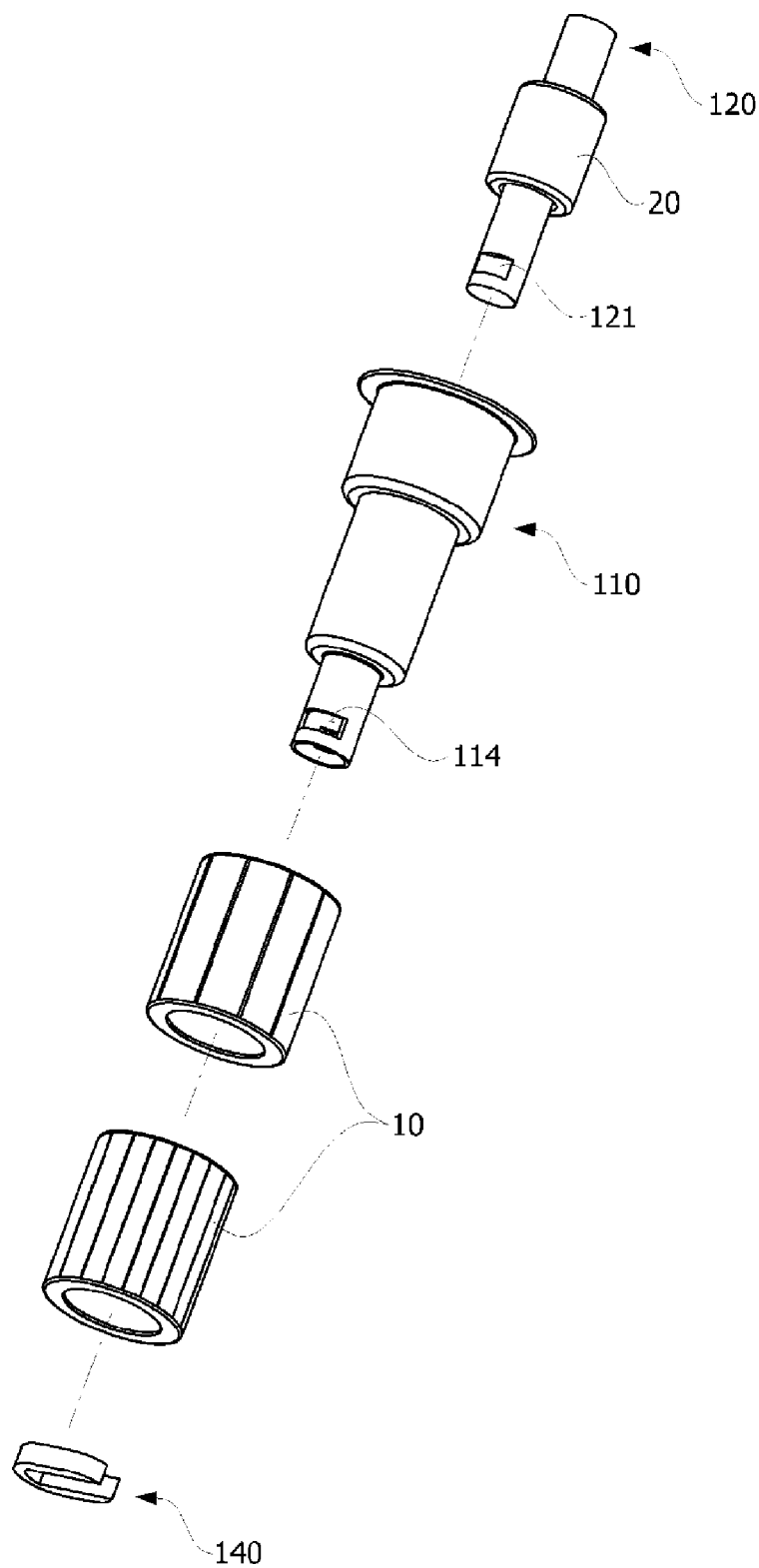
FIG. 4 is an exploded perspective view of the rotor assembly illustrated in FIG. 2.
Figure 5:
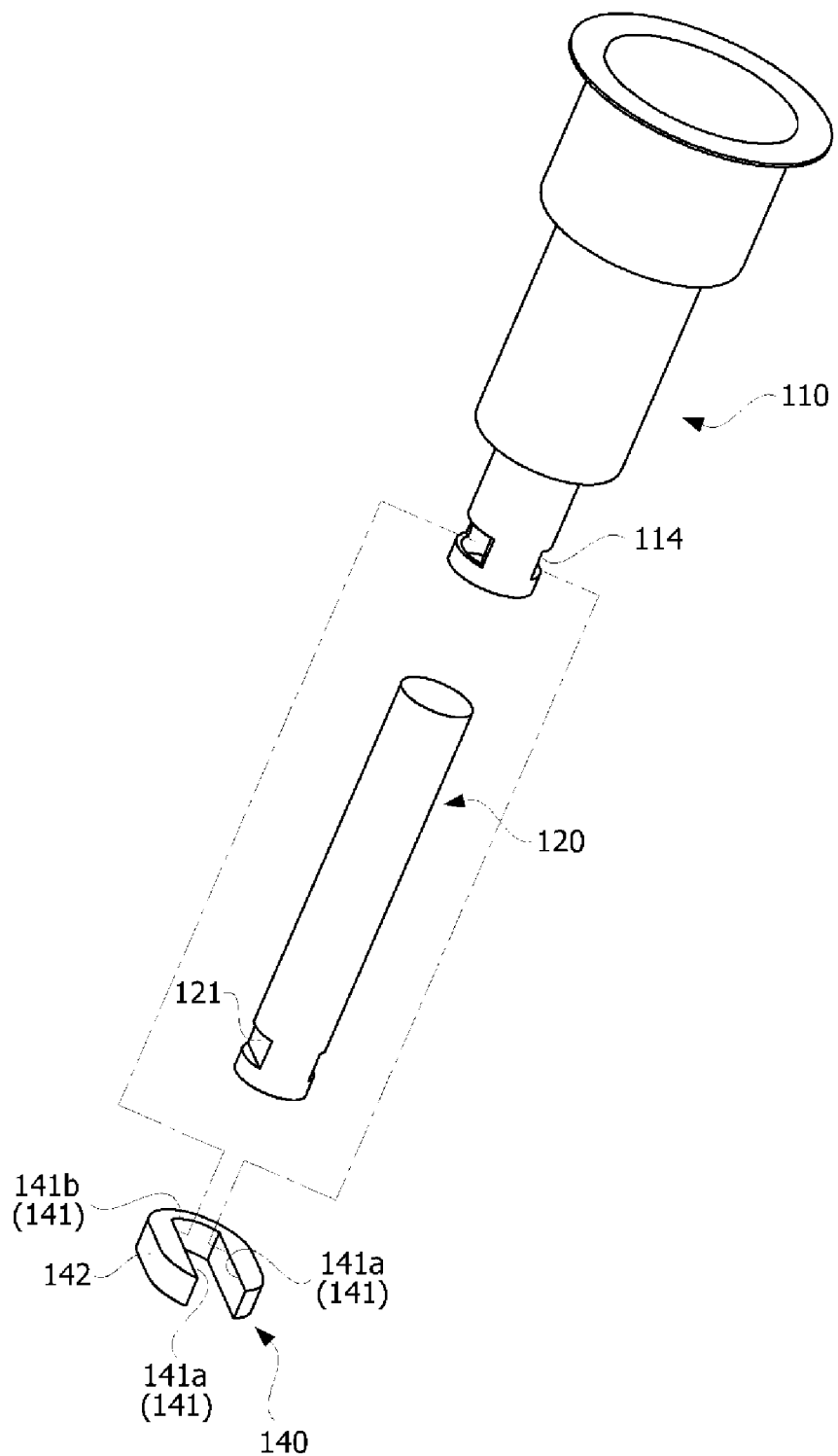
FIG. 5 is a view illustrating a slip prevention unit that is interposed between a rotor tube and a shaft.

FIG. 4 is an exploded perspective view of the rotor assembly illustrated in FIG. 2, and FIG. 5 is a view illustrating a slip prevention unit that is interposed between the rotor tube 110 and the shaft 120 to prevent a slip between the rotor tube 110 and the shaft 120.

A first cut-out portion 121 may be formed at a lower end portion of the shaft 120. The first cut-out portion 121 may be formed by cutting out inward a predetermined region of the lower end portion of the shaft 120 in a radial direction. The first cut-out portion 121 may be formed to be symmetric about a center of an axis of the shaft 120.

A second cut-out portion 114 may be formed in the lowermost stepped region 111 of the rotor tube 110 so as to correspond to the first cut-out portion 121. The second cut-out portion 114 may be formed by cutting out inward a predetermined region of the lowermost stepped region 111 in a radial direction. The second cut-out portion 114 may be formed to be symmetric about a center of an axis.

A slip prevention unit 140 is fitted into the first cut-out portion 121 and the second cut-out portion 114 in a state in which the rotor tube 110 is fitted into the lower end portion of the shaft 120, and the first cut-out portion 121 and the second cut-out portion 114 are aligned with each other. The slip prevention unit has a structure similar to a U-shaped bracket or a C-clip.

In this case, the slip prevention unit 140 may be fitted into the first cut-out portion 121 and the second cut-out portion 114 so that both side walls 141a of a slot 141 may come into direct contact with a cut-out surface of the first cut-out portion 121 and a cut-out surface of the second cut-out portion 114. As a result, the slip prevention unit 140 restricts the rotor tube 110 and the shaft 120 from being moved in a rotation direction, thereby preventing a slip between the rotor tube 110 and the shaft 120.

Meanwhile, a rear wall 141b, which is positioned between the both the side walls 141a of the slot 141, may be formed to be rounded so as to come into close contact with an outer circumferential surface of the rotor tube 110. Further, a predetermined region of an outer circumferential surface of the slip prevention unit 140 may be formed to have cut-out surfaces 142 in parallel with both the side walls 141a.

A washer (30 in FIG. 1), which is installed to support a lower surface of the multiple-row bearing 130, may be formed to be fitted along the cut-out surfaces 142 of the slip prevention unit 140.

As described above, according to the motor according to the exemplary embodiment of the present disclosure, a degree of design freedom at an upper region of the shaft may be improved by preventing the shaft from rattling using a single bearing. Further, a slip between the rotor tube and the shaft may be prevented.

The present disclosure has been made in an effort to provide a motor capable of increasing structural stability of the motor and minimizing a space occupied by a bearing, by improving a configuration in which single-row bearings are installed at an upper end portion and a lower end portion of a shaft.

An exemplary embodiment of the present disclosure provides a motor including: a stator; a rotor tube which is formed inside the stator; a rotor core assembly which is coupled to an outer circumferential surface of the rotor tube; and a shaft which is coupled in the rotor tube, in which the rotor tube is divided into at least two stepped regions having different diameters, and includes a multiple-row bearing which has an inner wheel coupled to an outer circumferential surface of any one of the at least two stepped regions, and rotatably supports the rotor tube.

A diameter of the rotor tube may be decreased in a stepwise direction, thereby forming at least two stepped regions. The multiple-row bearing may rotatably support a lowermost stepped region of the stepped regions.

An upper surface of the inner wheel of the multiple-row bearing may support a stepped portion of the lowermost stepped region.

The rotor core assembly may be installed on any one of the stepped regions which are positioned between an uppermost stepped region and a lowermost stepped region of the stepped regions.

The multiple-row bearing may support the rotor tube in at least one direction of an axial direction and a radial direction.

The shaft may include a first cut-out portion which is formed by being cut out inward in a radial direction, the rotor tube may include a second cut-out portion which is formed by being cut out inward in a radial direction so as to correspond to the first cut-out portion, and the motor may further include a slip prevention unit which has a slot into which the first cut-out portion and the second cut-out portion, which are aligned, are fitted.

Both a cut-out surface of the first cut-out portion and a cut-out surface of the second cut-out portion may come into direct contact with a side wall of the slot.

The slip prevention unit may be installed to support a lower surface of the inner wheel of the multiple-row bearing.

An upper-row bearing of the multiple-row bearing may be any one of an angular contact ball bearing, a 4-point contact ball bearing, a tapered roller bearing, and a ball bearing.

A lower-row bearing of the multiple-row bearing may be any one of an angular contact ball bearing, a 4-point contact ball bearing, a tapered roller bearing, and a ball bearing.

According to the exemplary embodiment of the present disclosure, a single-row bearing, which has been installed at an upper end portion of the rotor tube, is eliminated, and a multiple-row bearing, which rotatably supports a lower end portion of the rotor tube, is provided, such that a lower end portion of the shaft, which may greatly rattle, is supported by a single multiple-row bearing having a relatively large supporting area, thereby providing advantageous effects of ensuring structural stability of the motor, and minimizing a space occupied by a bearing.

According to the exemplary embodiment of the present disclosure, the slip prevention unit, which restricts the rotor tube and the shaft in a rotation direction, is provided, thereby providing an advantageous effect of preventing a slip between the rotor tube and the shaft.

It should be understood that when one constituent element is referred to as being "coupled to" or "connected to" another constituent element, one constituent element can be directly coupled to or connected to the other constituent element, but intervening elements may also be present. In contrast, when one constituent element is referred to as being "directly coupled to" or "directly connected to" another constituent element, it should be understood that there are no intervening elements.

Terms used in the present application are used only to describe specific exemplary embodiments, and are not intended to limit the present disclosure. Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
a stator;
a rotor tube which is disposed inside the stator;
a rotor core assembly which is coupled to an outer circumferential surface of the rotor tube; and
a shaft which is coupled in the rotor tube,
wherein the rotor tube is divided into at least two stepped regions having different diameters, and includes a multiple-row bearing which has an inner wheel coupled to an outer circumferential surface of any one of the at least two stepped regions, and rotatably supports the rotor tube,
wherein diameters of the at least two stepped regions are decreased in a stepwise manner toward a lower end thereof,
wherein the inner wheel of the multiple-row bearing is coupled to an outer circumferential surface of a lower stepped region of the stepped regions, and
wherein an upper surface of the inner wheel of the multiple-row bearing supports a stepped portion of the lower stepped region.

2. A motor comprising:
a stator;
a rotor tube which is disposed inside the stator;
a rotor core assembly which is coupled to an outer circumferential surface of the rotor tube; and
a shaft which is coupled in the rotor tube,
wherein the rotor tube is divided into at least two stepped regions having different diameters, and includes a multiple-row bearing which has an inner wheel coupled to an outer circumferential surface of any one of the at least two stepped regions, and rotatably supports the rotor tube, and
wherein the shaft includes a first cut-out portion which is formed by being cut out inward in a radial direction, the rotor tube includes a second cut-out portion which is formed by being cut out inward in a radial direction so as to correspond to the first cut-out portion, and the motor further includes a bracket which has a slot into which the first cut-out portion and the second cut-out portion, which are aligned, are fitted.

3. The motor of claim 2, wherein both a cut-out surface of the first cut-out portion and a cut-out surface of the second cut-out portion come into direct contact with a side wall of the slot.

4. The motor of claim 2, wherein the bracket is installed to support a lower surface of the inner wheel of the multiple-row bearing.

* * * * *